United States Patent
Sendhoff et al.

(10) Patent No.: US 7,739,206 B2
(45) Date of Patent: Jun. 15, 2010

(54) COMBINING MODEL-BASED AND GENETICS-BASED OFFSPRING GENERATION FOR MULTI-OBJECTIVE OPTIMIZATION USING A CONVERGENCE CRITERION

(75) Inventors: Bernhard Sendhoff, Bruchkobel (DE); Yaochu Jin, Rodgau (DE); Edward Tsang, Colchester (GB); Qingfu Zhang, Colchester (GB); Aimin Zhou, Colchester (GB)

(73) Assignee: Honda Research Institute Europe GmbH (DE)

( * ) Notice: Subject to any disclaimer, the term of this patent is extended or adjusted under 35 U.S.C. 154(b) by 821 days.

(21) Appl. No.: 11/623,639

(22) Filed: Jan. 16, 2007

(65) Prior Publication Data
US 2007/0174221 A1   Jul. 26, 2007

(30) Foreign Application Priority Data
Jan. 24, 2006   (EP) .................................. 06001449

(51) Int. Cl.
*G06F 15/18* (2006.01)
*G06N 3/00* (2006.01)
*G06N 3/12* (2006.01)

(52) U.S. Cl. ....................................................... 706/13
(58) Field of Classification Search .................. 706/12, 706/13
See application file for complete search history.

(56) References Cited

OTHER PUBLICATIONS

Mario Costa and Edmondo Minisci, "MOPED: a Multi-Objective Parzen-based Estimation of Distribution algorithm for continuous problems", Evolutionary Multi-Criterion Optimization. Second International Conference, EMO 2003, (pp. 282-294), Faro, Portugal.*
European Search Report, EP 06001449.5, Jul. 12, 2006, 8 Pages.
Zhou, A. et al., "A Model-Based Evolutionary Algorithm for Bi-objective Optimization," IEEE Congress on Evolutionary Computation, 2005, pp. 2568-2575, vol. 3, Piscataway, New Jersey, U.S.A.

(Continued)

*Primary Examiner*—Donald Sparks
*Assistant Examiner*—Vincent M Gonzales
(74) *Attorney, Agent, or Firm*—Fenwick & West LLP

(57) ABSTRACT

A system and method for combining the model-based and genetics-based methods are combined according to a convergence criterion. When the population is not converged, the genetics-based approach is used, and when the population is converged, the model-based method is used to generate offspring. The algorithm benefits from using a model-based offspring generation only when the population shows a certain degree of regularity, i.e., converged in a stochastic sense. In addition, a more sophisticated method to construct the stochastic part of the model can be used. Also a biased Gaussian noise (the mean of the noise is not zero), as well as a white Gaussian noise (the mean of the noise is zero) can be preferably used for the stochastic part of the model.

16 Claims, 3 Drawing Sheets

OTHER PUBLICATIONS

Pena, J. M. et al., "GA-EDA: Hybrid Evolutionary Algorithm Using Genetic and Estimation of Distribution Algorithms," The 17th International Conference on Industrial & Engineering Applications of Artificial Intelligence & Expert Systems, 2004, pp. 361-371, Springer-Verlag Berlin Heidelberg.

Zhang, Q. et al., "An Evolutionary Algorithm With Guided Mutation for the Maximum Clique Problem," IEEE Transactions on Evolutionary Computation, Apr. 2005, pp. 192-200, vol. 9, No. 2.

Oh, S. et al., "Implicit Rile-Based Fuzzy-Neural Networks Using the Identification Algorithm of GA Hybrid Scheme Based on Information Granulation," Advanced Engineering Informatics, Jul. 2002, pp. 247-263, vol. 16. No. 4.

Kim, H. et al., "An Efficient Genetic Algorithm With Less Fitness Evaluation by Clustering," IEEE Evolutionary Computation, May 2001, pp. 887-894, vol. 2, Piscataway, New Jersey, U.S.A.

* cited by examiner

COMBINING MODEL-BASED AND GENETICS-BASED OFFSPRING GENERATION FOR MULTI-OBJECTIVE OPTIMIZATION USING A CONVERGENCE CRITERION

RELATED APPLICATIONS

This application claims priority to European Patent Application 06001449.5 filed on Jan. 24, 2006 and is incorporated by reference herein in its entirety.

FIELD OF THE INVENTION

The present invention relates to a new population-based algorithm for solving multi-objective optimization problems. The algorithm combines genetics-based offspring generation (crossover and mutation) with model-based offspring generation techniques. The algorithm is carried out in an automated fashion, i.e. on a computing device.

A typical application of the invention is the optimization of designs e.g. of aerodynamic or hydrodynamic bodies.

BACKGROUND OF THE INVENTION

Multi-objective optimization (MOO) or multi-criterion programming is one of the challenging problems encountered in various engineering problems such as e.g. the design of aerodynamic or hydrodynamic shapes. The present invention relates to the following multi-objective optimization problem (MOP) in continuous search space as shown in equation (1).

$$\min F(X) = (f_1(X), \ldots, f_m(X))^T; X \in \Omega \quad (1)$$

where X is the decision vector, F(X) is the corresponding objective vector, and $\Omega \in R^n$ is the decision space. Many evolutionary algorithms (EAs) have successfully been employed to tackle MOPs over the past decade. Several important techniques, such as the use of a second population (or an archive) have proved to be able to greatly improve the performance of EAs.

In contrast to single objective optimization, the distribution of the Pareto-optimal solutions often shows a high degree of regularity The term "Pareto-optimal solutions" is well known in the field of MOO, see e.g. for this and other terms used in the present specification and the claims the glossary for terms in the field of Evolutionary Algorithms (EA) at http://ls11-www.cs.uni-dortmund.de/people/bever/EA-glossary/ which are incorporated by reference herein in its entirety.

Conventionally, this regularity has often been exploited implicitly by introducing a local search after evolutionary optimization. A step further to take advantage of such regularity is the use of a model that captures the regularity of the distribution of the Pareto-optimal solutions (Aimin Zhou, Qingfu Zhang, Yaochu Jin, Edward Tsang, and Tatsuya Okabe, *A model-based evolutionary algorithm for bi-objective optimization*, In Congress on Evolutionary Computation, Edinburg, U.K, September 2005, IEEE which is incorporated by reference herein in its entirety). In this paper, a linear or quadratic model is used in odd generations and a crossover and mutation in even generations to produce offspring.

The model-based offspring generation method used in the present invention is closely related to a large class of search algorithms known as estimation of distribution algorithms (EDAs) in the evolutionary computation community. EDAs first build probabilistic models to approximate the distribution of selected solutions in the population. Then, new solutions are generated by sampling from the probabilistic models. EDAs have been successfully used in single-objective optimization problems.

EDAs have also been extended for multi-objective optimization. In one known method, $\lfloor \tau N \rfloor$ best performing solutions from the current population (N is population size and $0.0 < \tau < 1.0$) are selected first. Then the randomization Euclidean leader algorithm may be used to partition the selected points into several clusters. In each cluster, a Gaussian probability model is built to simulate the distribution of the solutions. Then $N - \lfloor \tau N \rfloor$ solutions are sampled one by one from the models. This algorithm has been employed to solve both discrete and continuous problems.

Contrary to the conventional EDAs, the model in the multi-objective algorithm suggested by Aimin Zhou et al. (A model-based evolutionary algorithm for bi-objective optimization, cited above) consists of two parts, namely, a deterministic part and a stochastic part. The deterministic model aims to capture the regularity in the distribution of the population, while the stochastic model attempts to describe the local dynamics of the individuals. The model-based offspring generation method is then hybridized with the crossover and mutation in a heuristic way, i.e., in all odd generations the model-based method, and in all even generations the genetics-based method, is employed to generate offspring.

SUMMARY OF THE INVENTION

The present invention further develops the method proposed by Aimin Zhou et al. (cited above). First, the model-based and genetics-based methods are combined according to a convergence criterion. When the population is not converged, the genetics-based approach is used, and when the population is converged, the model-based method is used to generate offspring. The algorithm benefits from using a model-based offspring generation only when the population shows a certain degree of regularity, i.e., converged in a stochastic sense. Second, a more sophisticated method to construct the stochastic part of the model can be used. Third, a biased Gaussian noise (the mean of the noise is not zero), as well as a white Gaussian noise (the mean of the noise is zero) can be preferably used for the stochastic part of the model.

In contrast to the existing estimation distribution algorithms (EDAs), the invention proposes, in one aspect, to use a model consisting of a deterministic part and a stochastic part. The deterministic part of the model captures the regularity of the distributions of the Pareto-optimal solutions, while the stochastic part simulates the local dynamics of the population. The deterministic model is constructed using the principal curve/surface, which can be approximated by a number of linear curves or planes. To this end, the population is first divided into a number of clusters using the local principal component analysis (PCA) method. The stochastic model can be a biased or non-biased noise model. The standard deviation of the noise model is estimated by calculating the standard deviation of the distance to the reference vector for all solutions within a cluster, which is completely different to the method reported in Aimin Zhou et al. cited above. In case a biased noise model is implemented, mean (bias) of the noise is the average distance between the reference vector of the current parent generation and that of the parent in the previous generation of the same cluster.

Another aspect of one embodiment of the invention is the introduction of a convergence criterion that determines whether the genetic-based or model-based offspring generation should be used. In the two-objective case, this can be determined by the ratio between the largest and the second largest eigenvalues, for example, and in the three-objective case, between the second largest and the third largest eigenvalues of the individuals in each cluster. The eigenvalues can be calculated either in the decision space (X) or in the objective space (F).

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

DETAILED DESCRIPTION OF THE INVENTION

Figure 1:
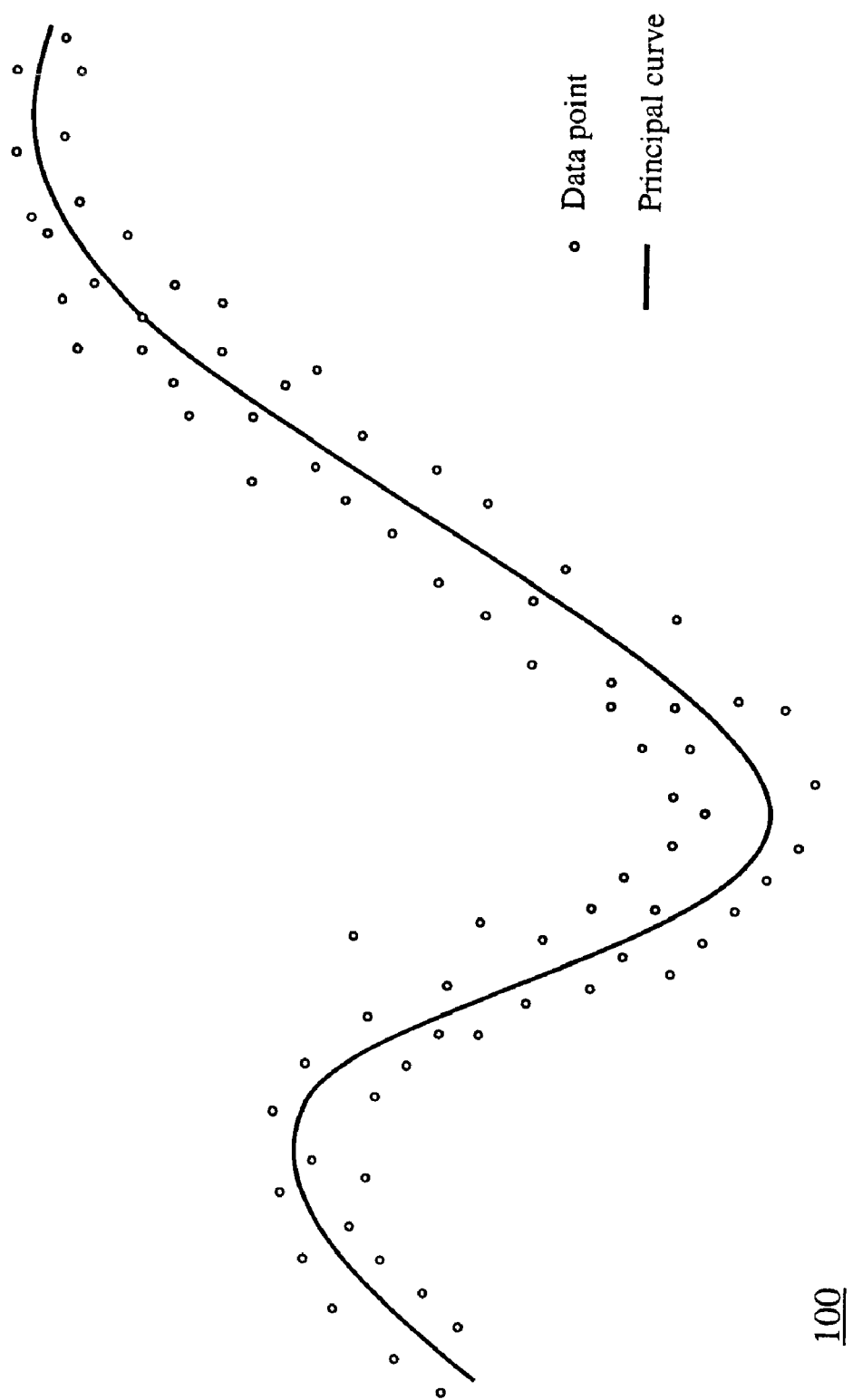
FIG. 1 is an example of a principal curve in a two-dimensional space in accordance with one embodiment of the present invention.

A preferred embodiment of the present invention is now described with reference to the figures where like reference numbers indicate identical or functionally similar elements. Also in the figures, the left most digit of each reference number corresponds to the figure in which the reference number is first used.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

A. Principal Curve Based Modelling of Regularity

FIG. 1 shows a principal curve in a two-dimensional space in accordance with one embodiment of the present invention. A principal curve is a smooth one-dimensional (1-D) curve that passes through the middle of a set of data points. A principal surface is a two-dimensional (2-D) version of the principal curve.

Suppose the population P(t) is partitioned into K clusters (sub-populations) $C^k = \{X_i^k | i=1, \ldots, N^k\}$, $k=1; \ldots ; K$. This partition may be obtained using a local principal component analysis (local PCA) clustering algorithm as described by Nandakishore Kambhatla and Todd K. Leen, *Dimension reduction by local principal component analysis*, Neural Computation, 9(7):1493-1516, October 1997 which is incorporated by reference herein in its entirety. The local PCA clustering algorithm is advantageous over the widely used k-means clustering method when the distribution of the data can be better described by a linear curve (a reference vector) rather than a reference point (cluster center in k-means clustering). In the k-th cluster $C^k$, the i-th biggest eigenvalue is $\lambda_i^k$; i=1, ..., n, its corresponding normalized eigenvector is $V_i^k$ and the mean of cluster $C^k$ is $\overline{X}^k$, k=1, ..., K. So the projections on the first and second eigenvectors for each point may be calculated as:

$$s_{1,i}^k = (X_i^k - \overline{X}^k)^T V_1^k,$$

$$s_{2,i}^k = (X_i^k - \overline{X}^k)^T V_2^k,$$

where k=1, ..., K and i=1, ..., $N^k$.

With the partition of the data, a group of linear models may be built to approximate a principal curve or a principal surface. One model may be built in each data cluster.

If the MOP is a 2-objective problem, in cluster $C^k$, a 1-D linear model will be built, which is a line passing through the point with the value of $\overline{X}^k$. The first eigenvector determines the direction. And the model may be described by:

$$H^k(s) = sV_1^k + \overline{X}^k$$

$$s_{min}^k = \min_{i=1,\ldots,N^k}\{s_{1,i}^k\},$$

$$s_{max}^k = \max_{i=1,\ldots,N^k}\{s_{1,i}^k\},$$

where the latent variable s is a scalar.

For MOPs with three or more objectives, the local principal curve becomes a linear manifold. It is assumed that the Pareto front is a (m−1) dimensional manifold if the number of objectives is m. However, for some ill-conditional problems, the dimension of an m-objective problem may be lower than m−1. In this case, the point with the value of $\overline{X}^k$ and the first two eigenvectors, $V_1^k$, and $V_2^k$ may determine a 2-D plane surface to approximate the principal surface:

$$H^k(s) = s_1 V_1^k + s_2 V_2^k + \overline{X}^k$$

$$s_{1,min}^k = \min_{i=1,\ldots,N^k}\{s_{1,i}^k\},$$

$$s_{1,max}^k = \max_{i=1,\ldots,N^k}\{s_{1,i}^k\},$$

$$s_{2,min}^k = \min_{i=1,\ldots,N^k}\{s_{2,i}^k\},$$

$$s_{2,max}^k = \max_{i=1,\ldots,N^k}\{s_{2,i}^k\},$$

where the latent variable is a vector $s = (s_1; s_2)^T$.

B. The Probabilistic Model

In one embodiment of the present invention, the probabilistic model consists of a deterministic model that captures the regularity and a Gaussian model that simulates the local dynamics of the population:

$$H^k = H^k(s) + \xi^k$$

where $H^k(s)$ is the deterministic model describing the distribution of the solutions, and $\xi_k$ is a random vector with a normal distribution $N(\mu, (\delta^k)^2 I)$, where $\mu$ and $\delta$ are the mean and standard deviation of the Gaussian model, I is an n×n identity matrix and k=1, ..., K. The Gaussian model is non-biased if the mean $\mu$ is set to 0, otherwise, the Gaussian model is biased. If a biased Gaussian model is used, the mean is obtained by calculating the averaging distance between the reference vector of k-th cluster of this generation and that of the previous generation.

In the local PCA clustering process, the distance (denoted by $d_i^k$) between a point and the reference vector of the k-th cluster needs to be calculated. The standard deviation of $d_i^k$ may thus be calculated and used as the standard deviation of the Gaussian model:

$$\delta^k = \frac{\sum_{i=1}^{N^k} d_i^k}{N^k \sqrt{n}}$$

where k=1, ..., K, n is the number of decision parameters, and $N^k$ is the number of points in the k-th cluster.

C. Offspring Generation by Sampling from the Model

In the model building stage, K models are obtained:

$$H^k = H^k(s) + \xi^k, \text{ such that } s \in [s_{min}^k, s_{max}^k]$$

where k=1, ..., K.

With these models, offspring may be created by sampling from the model. The sampling is quite straightforward. For each model $H^k$; k=1, ..., K, one may uniformly choose $N^k$ (the number of individuals in k-th cluster) latent variables in each range $[s_{min}^k; s_{max}^k]$ and create new solutions from the model in the above equation.

Figure 2:
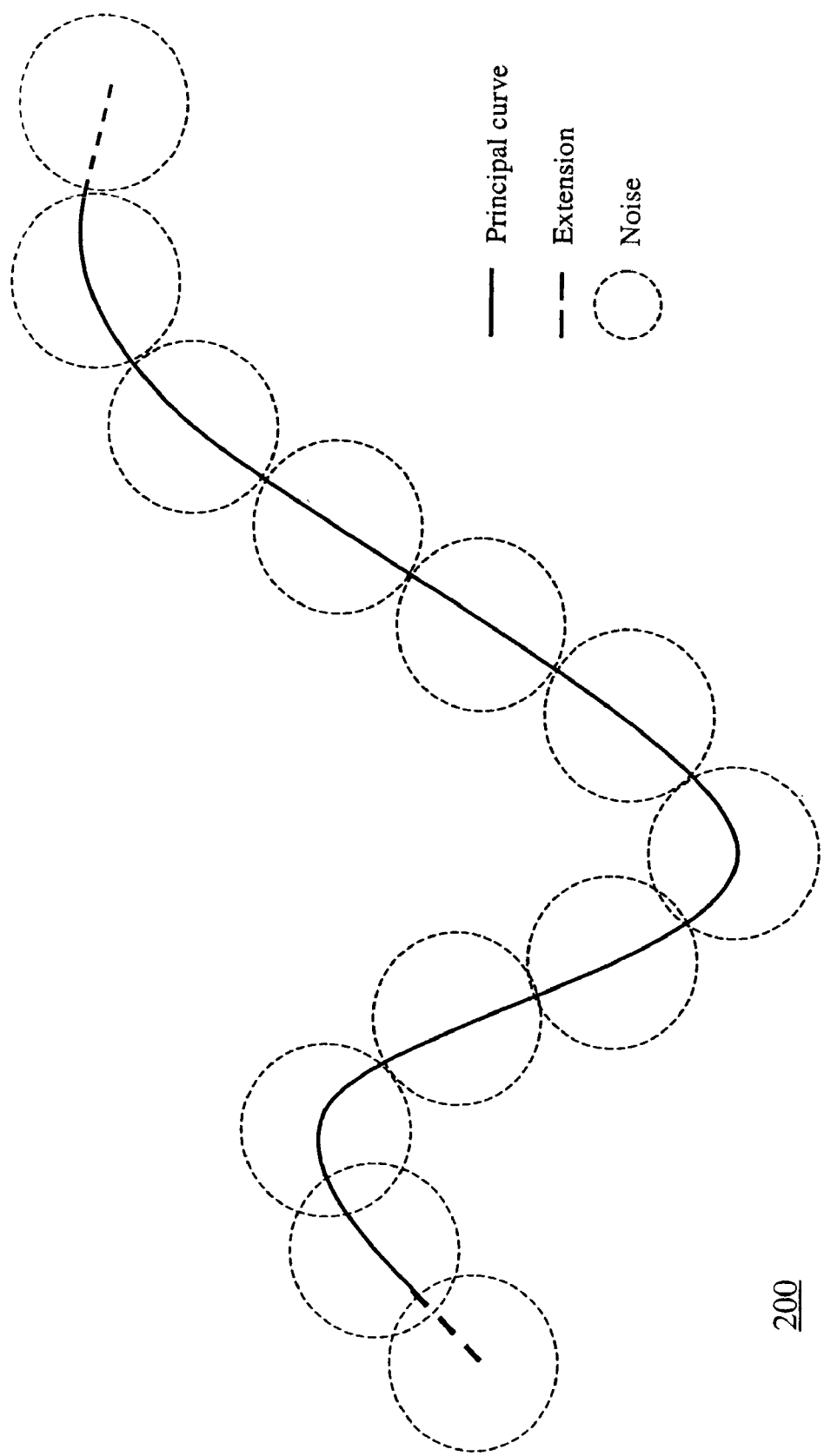
FIG. 2 is an example of model sampling with extension in accordance with one embodiment of the present invention.

To improve the exploration capability of the algorithm, one may also generate offspring by extrapolating the models at the two extremes, as is shown in FIG. 2. This can be realized by generating new points in the range of:

$$[s_{min}^k - \epsilon(s_{max}^k - s_{min}^k); s_{max}^k + \epsilon(s_{max}^k - s_{min}^k)]$$

instead of in the range of $[s_{min}^k; s_{max}^k]$. In the above equation, $\epsilon$ is the extension ratio, which is a parameter of the algorithm to be defined by the user. An adaptive strategy may also be used to determine this parameter: if the solutions generated from the extended range are good, $\epsilon$ may be increased in the next generation. Otherwise, the ratio may be decreased in the next generation.

D. Convergence Criterion

As mentioned, the proposed algorithm uses either the genetics-based or the model-based method for generating offspring. Whether the genetics-based or the model-based mechanism should be used depends on the distribution of the population. In other words, when the population has not converged, offspring is generated using the traditional genetics-based operators. When the population shows a certain degree of convergence, the model is used to generate offspring.

There may be different criteria to check if a population has converged. The convergence in multi-objective optimization is very different to that in single objective optimization. That is, in a converged status, the distribution of an MOO population may be a curve or a surface, but not a point. In the present invention, a convergence criterion for the k-th cluster is defined as follows:

$$\psi(k) = \begin{cases} \sqrt{\dfrac{\lambda_2^k}{\lambda_1^k}}, & \text{for 2-objective problems} \\ \sqrt{\dfrac{\lambda_3^k}{\lambda_2^k}}, & \text{for 3-objective problems} \end{cases}$$

The above convergence criterion is used to measure the degree of convergence for the individuals in a cluster to determine which offspring generation strategy should be used. This definition is reasonable because the eigenvalues represent the variance of a population and the squared root of the eigenvalues represents the deviation in different directions.

The convergence criteria can be calculated either in the decision space (parameter space) or in the objective space.

E. Algorithm Framework

Figure 3:
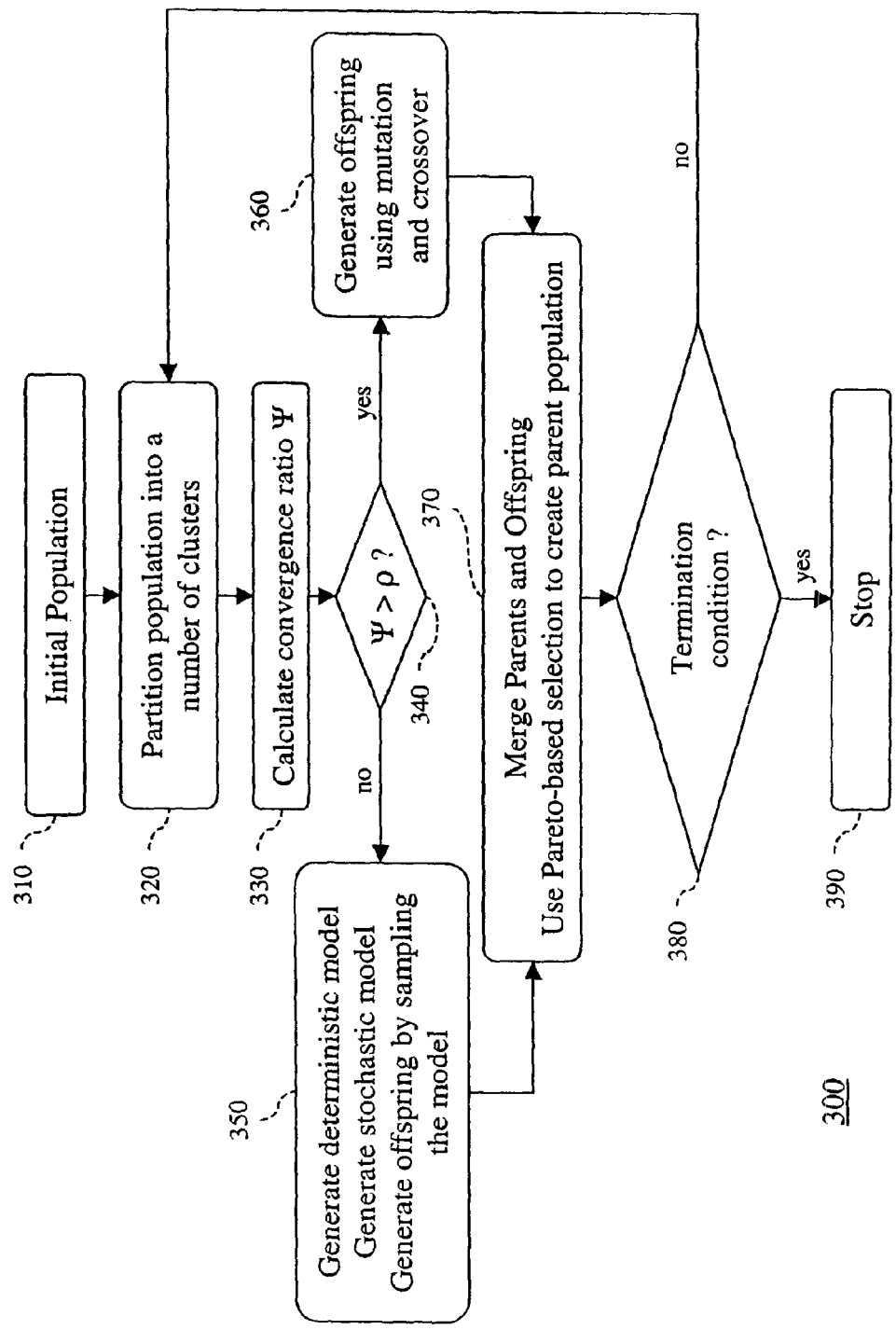
FIG. 3 illustrates the framework of the hybrid algorithm in accordance with one embodiment of the present invention.

The main framework of the proposed algorithm 300 in accordance with one embodiment of the present invention is described with reference to FIG. 3, which works for bi-objective or 3-objective problems.

In step 310, an initial population is provided at time t=0. In step 320, this population is partitioned into a set of clusters. For this purpose, local principal component analysis (PCA) may be used.

Then, for each cluster, the convergence ratio $\Psi$ is calculated in step 330. If the convergence ratio is smaller or equal than a defined threshold value $\rho$, which is checked in step 340, the algorithm will generate a deterministic and a stochastic model, from which offspring is generated by sampling the model in step 350. If the convergence ratio is larger than the threshold value, offspring is generated using genetics-based methods like mutation and crossover in step 360.

The generated offspring and the parents are subsequently merged in step 370, wherein Pareto-based selection is used to create a new parent population. A Pareto-based selection method first assigns a rank to each individual based on the dominance comparison. A solution X dominates a solution Y if all objectives of solution X are no worse than those of Y and at least one objective of solution X is better than that of Y. If a solution is not dominated by any other solutions, a rank of 1 is assigned, if it is dominated by one solution, a rank of 2 is assigned, and so on. During selection, individuals with a lower rank are preferred. Several variants of Pareto-based selection methods have been suggested. In the present invention, we employ the non-dominated sorting and the crowded tournament selection as suggested in Deb et al., *A fast and elitist multi-objective genetic algorithm: NSGA-II*, IEEE Transactions on Evolutionary Computation. 6(2):182-197, 2002 which is incorporated by reference herein in its entirety. In step 380, it is checked whether a termination or stop criterion is met. If not, the procedure returns to step 320, now using the newly created parent population. Otherwise, the algorithm terminates in step 390. Thereafter the result or, in some embodiments, an intermediate result can be output by the system.

The described algorithm may be represented in pseudo-code as shown in Table 1:

TABLE 1

```
INITIALIZATION: Set t = 0 and initialize P(t).
REPRODUCTION:
1.1 Partition P(t) into clusters C^k; k = 1, ...,K using local PCA;
1.2 For each cluster C^k; k = 1, ...,K,
   If Ψ(k) < ρ build a 1-D linear model or 2-D plane surface model,
      sample N^k new solutions and store them in P_s(t);
   Else perform crossover and mutation on C^k to generate N^k new
      solutions and store them in P_s(t).
SELECTION: Select P(t + 1) from P_s(t) ∪ P(t).
STOP CONDITION: If the stop condition is met, stop;
   otherwise, set t = t + 1 and go to Step 1.1.
```

To distinguish this algorithm from the one conceived by Aimin Zhou et al, cited above, their method shall be termed a model-based evolutionary algorithm with a hybrid strategy A (MEA/HA) and the one proposed by the present invention a model-based evolutionary algorithm with a hybrid strategy B (MEA/HB).

As in MEA/HA, a simulated binary crossover (SBX-$\eta_c$) and a simulated binary mutation (SBM-$\eta_m$) are adopted as the genetic-based method for generating offspring, where $\eta_c$ and $\eta_m$ are the distribution parameter of the two operators, respectively. The differences between MEA/HA and MEA/HB can be summarized as follows: (1) In MEA/HA, the model-based method and genetics-based method are used alternatively while in MEA/HB, they are used adaptively according to the convergence criterion $\Psi(k)$. This means that, in MEA/HB, at the beginning stage, the genetics-based offspring generation method will play a major role, while at the later stage, the model-based method will more often be used to generate offspring. (2) A new strategy to estimate the standard deviation of the Gaussian model is suggested in MEA/HB and thus the offspring generated by the model have a better quality. Instead of generating only $N^k/3$ individuals in each cluster in MEA/HA, all $N^k$ new solutions are generated from the model in MEA/HB, where $N^k$ is the number of individuals in the k-th cluster. (3) In MEA/HA, the noise model is white noise, that is, the mean of the noise is always set to 0. In MEA/HB, the noise can be white or biased. The bias of the noise model provides a "search direction" so that the search can be sped up greatly.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. A computer-implemented method for multi-objective optimization of an aerodynamic or hydrodynamic design, comprising the steps of:
   (a) providing an initial population of solutions as a parent population;
   (b) partitioning said parent population into a number of clusters;
   (c) determining a convergence ratio ($\Psi$) for each of said clusters;
   (d) determining whether the convergence ratio ($\Psi$) of each cluster is larger than a given threshold value ($\rho$),
   (e1) generating offspring using a model when the convergence ratio ($\Psi$) is smaller or equal to the given threshold value ($\rho$), wherein the model uses an estimation of distribution algorithm (EDA) and the model includes a deterministic part and a stochastic part;
   (e2) generating offspring using mutation and crossover when the convergence ratio ($\Psi$) is larger than the given threshold value ($\rho$);
   (f) merging parents and offspring;
   (g) creating a new parent population using a Pareto-based selection method; and
   (h) repeating steps (b) through (g) using the new parent population, until a stop criterion is met.

2. The method of claim 1, wherein the noise in the stochastic part of the model is biased.

3. The method of claim 2, wherein the standard deviation of the noise model is determined by the equation:

$$\delta^k = \frac{\sum_{i=1}^{N^k} d_i^k}{N^k \sqrt{n}}$$

where $d_i^k$ is the distance of the i-th point in cluster k to its reference vector, n is the dimension of decision space, $N^k$ is the number of points in k-th cluster, and k is the index for the k-th cluster.

4. The method of claim 1, wherein the noise in the stochastic part of the model is not biased.

5. The method of claim 4, wherein the mean of the noise, together with the direction of the bias, is determined by calculating the average distance between the reference vector of the current parent individuals and that of the previous parent individuals of the same cluster.

6. The method of claim 4, wherein the standard deviation of the noise model is determined by the equation:

$$\delta^k = \frac{\sum_{i=1}^{N^k} d_i^k}{N^k \sqrt{n}}$$

where $d_i^k$ is the distance of the i-th point in cluster k to its reference vector, n is the dimension of decision space, $N^k$ is the number of points in k-th cluster, and k is the index for the k-th cluster.

7. The method of claim 1, wherein optimization uses two objectives and the convergence ratio ($\Psi$) is determined by the ratio between the largest eigenvalue and the second largest eigenvalue of the corresponding cluster.

8. The method of claim 7, wherein the eigenvalues are calculated in the decision space.

9. The method of claim 7, wherein the eigenvalues are calculated in the objective space.

10. The method of claim 1, wherein the optimization uses three objectives and the convergence ratio is determined by the ratio between the second largest and the third largest eigenvalue of the corresponding cluster.

11. The method of claim 10, wherein the eigenvalues are calculated in the decision space.

12. The method of claim 10, wherein the eigenvalues are calculated in the objective space.

13. The method of claim 1, further comprising the step of:
    (i) outputting at least one of said new parent population or offspring.

14. The method according to claim 1, wherein the step of partitioning the population into clusters uses local principal component analysis (PCA).

15. A computer software program product embodied on a non-transitory computer readable medium for performing the method of claim 1 when run on a computing device.

16. A non-transitory computer-readable medium, having stored thereon a software product for performing the method according to claim 1.

* * * * *